United States Patent [19]
Kono et al.

[11] Patent Number: 5,611,750
[45] Date of Patent: Mar. 18, 1997

[54] SLIP CONTROL APPARATUS FOR MOTOR VEHICLE LOCK-UP CLUTCH

[75] Inventors: Katsumi Kono, Toyota; Shinya Nakamura, Owariasahi; Atsushi Honda, Susono, all of Japan

[73] Assignee: Toyoda Jidosha Kabushiki Kaisha, Toyota, Japan

[21] Appl. No.: 503,617

[22] Filed: Jul. 18, 1995

[30] Foreign Application Priority Data

Jul. 20, 1994 [JP] Japan ................................ 6-167981
Jul. 13, 1995 [JP] Japan ................................ 7-177353

[51] Int. Cl.$^6$ .......................................... F16H 61/14
[52] U.S. Cl. ........................................... 477/65; 477/169
[58] Field of Search .......................... 477/64, 65, 74, 477/169, 176

[56] References Cited

U.S. PATENT DOCUMENTS

| | | | |
|---|---|---|---|
| 4,947,734 | 8/1990 | Fujita et al. | 477/65 |
| 5,029,087 | 7/1991 | Cowan et al. | 477/65 |
| 5,141,089 | 8/1992 | Nobumoto et al. | 477/169 |
| 5,303,616 | 4/1994 | Palansky et al. | 477/65 |
| 5,341,703 | 8/1994 | Palansky et al. | 477/65 |
| 5,417,622 | 5/1995 | Asayama et al. | 477/65 |

FOREIGN PATENT DOCUMENTS 5-99331  4/1993  Japan.
5-180332  7/1993  Japan.

Primary Examiner—Dirk Wright
Attorney, Agent, or Firm—Oblon, Spivak, McClelland, Maier & Neustadt, P.C.

[57] ABSTRACT

An apparatus for controlling the amount of slip of a lock-up clutch between pump and turbine impeller of a torque converter or other fluid-filled power transmitting device in a motor vehicle, the lock-up clutch including a piston which is operated by a pressure difference between pressures in two oil chambers on the opposite sides of the piston, and the apparatus including a slip control device for controlling the lock-up clutch according to a slip control output such that the actual slip of the lock-up clutch coincides with a target slip speed, and an output oscillating device for oscillating the slip control output to oscillate the pressure difference without vibrating the piston. The slip control output is oscillated preferably when the pressure difference is relatively small, for example, when the torque of the lock-up clutch is smaller than a threshold or the vehicle deceleration rate is higher than a threshold, or when the target slip speed determined depending upon the vehicle running condition is almost equal to the actual slip speed.

18 Claims, 11 Drawing Sheets

| SHIFT POSITION | | SOLENOID VALVES | | C1 | C2 | B1 | B2 | F1 | B3 | F2 | C0 | F0 | B0 |
|---|---|---|---|---|---|---|---|---|---|---|---|---|---|
| | | S1 | S2 | | | | | | | | | | |
| P | | ⊗ | ⊗ | | | | | | | | ○ | | |
| R | | ⊗ | ⊗ | | ○ | | | | ○ | | ○ | | |
| N | | ⊗ | ⊗ | | | | | | | | ○ | | |
| D | 1st | ○ | × | ○ | | | | | | | ○ | ○ | |
| | 2nd | ○ | ○ | ○ | | | ○ | ○ | | ○ | ○ | ○ | |
| | 3rd | × | ○ | ○ | ○ | | ○ | | | | ○ | ○ | |
| | O/D | × | × | ○ | ○ | | ○ | | | | | | ○ |
| S | 1st | ○ | × | ○ | | | | | | | ○ | ○ | |
| | 2nd | ○ | ○ | ○ | | | ○ | ○ | | ○ | ○ | ○ | |
| | 3rd | × | ○ | ○ | ○ | | ○ | | | | ○ | ○ | |
| | (O/D) | × | × | ○ | ○ | | ○ | | | | | | ○ |
| L | 1st | ○ | × | ○ | | | | | | ○ | ○ | ○ | |
| | 2nd | ○ | ○ | ○ | | ○ | ○ | ○ | | ○ | ○ | ○ | |

FIG. 2

DUTY RATIO DSLU
(SLIP CONTROL CURRENT $I_{SLU}$)

PILOT PRESSURE $P_{SLU}$

SLIP CONTROL APPARATUS FOR MOTOR VEHICLE LOCK-UP CLUTCH

BACKGROUND OF THE INVENTION

1. Field of the Invention

The present invention relates to an apparatus for controlling the amount of slip of a lock-up clutch provided in a power transmitting system of a motor vehicle.

2. Discussion of the Related Art

In a motor vehicle having a fluid-filled power transmitting device equipped with a lock-up clutch, such as a torque converter or fluid coupling incorporating such a lock-up clutch, it is proposed to control the lock-up clutch in a slip control mode (partially slipping mode) such that an actual amount of slip (slip speed) of the lock-up clutch, namely, a difference between the speeds of a pump impeller and a turbine impeller eventually coincides with a predetermined target slip speed, for the purpose of improving the fuel economy of the vehicle while minimizing the power loss due to slipping of the lock-up clutch. The slip control mode is established when the running condition of the vehicle is in a predetermined slip control area which is intermediate between a fully releasing area in which the lock-up clutch should be held in a fully released state, and a fully engaging area in which the lock-up clutch should be held in a fully engaged state. These fully releasing, fully engaging and slip control areas are defined by suitable parameters (e.g., throttle valve opening and vehicle running speed) indicative of the vehicle running condition.

Generally, a lock-up clutch whose slip speed or amount is adjustable is provided with a piston which is operated by a hydraulic pressure source that permits full engagement of the lock-up clutch. Described in detail, the piston is moved depending upon a difference between pressures in two oil chambers, which are formed on the opposite sides of the piston. The amount of slip of the lock-up clutch is controlled by controlling the pressure difference of the two oil cheers to thereby change a thrust force acting on the piston and the resulting friction force of the clutch. Since the hydraulic pressure source that permits the full engagement of the clutch is utilized to control the lock-up clutch in the slip control mode, even a small amount of change in the pressure difference of the two oil chambers will result in a considerable amount of change in the slip amount of the lock-up clutch. That is, the slip amount of the clutch controlled in a feedback fashion tends to be excessively sensitive to a change in a slip control signal generated by a feedback control system. Further, the feedback control of the slip amount of the lock-up clutch suffers from comparatively low control stability, such as a variation in the speed of a vehicle engine due to a low control response upon initiation of the slip control of the lock-up clutch. To avoid engine speed variation, there is proposed a slip control apparatus wherein the slip control output prior to the initiation of the slip control is adjusted so that the pressure difference of the oil chambers is suitable for initiating the slip control without a variation in the engine speed due to the low control response. An example of such a slip control apparatus is disclosed in JP-A-5-99331.

However, the conventional slip control apparatus indicated above suffers from a poor response of the clutch piston to a change in the slip control output during the slip control of the lock-up clutch while the vehicle is in a certain decelerating or accelerating condition. Described more particularly, the pressure difference and the engagement force of the lock-up clutch are small where the target slip speed determined depending upon the vehicle running condition is almost equal to a difference of the input and output speeds of the fluid-filled power transmitting device (=slip speed of the device), which difference would exist or be established when the the lock-up clutch is placed in its fully released state. In this condition, the target slip speed can be attained by a comparatively small change in the slip control output of the slip control apparatus. Where the pressure difference of the lock-up piston is small, therefore, the actual slip speed of the lock-up clutch is not highly responsive to a change in the slip control output, due to a sliding resistance of the clutch piston and an oil leakage from the hydraulic system. Therefore, the feedback control of the pressure difference of the clutch tends to cause a control hunting, leading to deteriorated control stability of the lock-up clutch in certain running condition of the vehicle as indicated above.

SUMMARY OF THE INVENTION

It is therefore an object of the present invention to provide an apparatus for controlling the amount of slip of a lock-up clutch in a fluid-filled power transmitting system of a motor vehicle, which apparatus assures improved control stability even if the vehicle is in a running condition wherein the target slip speed determined by the running condition is almost equal to a speed difference or slip speed of the power transmitting device, which difference would be established when the lock-up clutch is placed in the fully released state.

The above object may be achieved according to the principle of this invention, which provides an apparatus for controlling an amount of slip of a lock-up clutch disposed between a pump impeller and a turbine impeller of a fluid-filled power transmitting device of a motor vehicle, the lock-up clutch including a piston operated by a pressure difference between hydraulic pressures in two oil chambers formed on opposite sides of the piston, the apparatus comprising: (a) slip control means for effecting a slip control operation according to a slip control output to control the amount of slip of the lock-up clutch while a running condition of the vehicle is in a predetermined slip control area, such that an actual slip speed of the lock-up clutch coincides with a target slip speed determined depending upon the running condition; and (b) output oscillating means operable during the slip control operation of the slip control means, for oscillating the slip control output of the slip control means, to oscillate the pressure difference without vibrating the piston.

In the slip control apparatus of the present invention constructed as described above, the slip control output of the slip control means for controlling the amount of slip of the lock-up clutch is oscillated by the output oscillating means to oscillate the pressure difference of the two oil chambers, without vibrating the piston. Accordingly, the thrust force which acts on the piston is oscillated so as to permit smooth movement of the piston with a high response to a change in the slip control output, even when the pressure difference acting on the piston is considerably small. In other words, the present slip control apparatus assures improved stability of control of the slip amount of the lock-up clutch even when the vehicle is in a running condition wherein the target slip speed determined by the running condition is almost or substantially equal to the speed difference or slip speed of the power transmitting device, which slip speed would be established when the lock-up clutch is placed in the fully released state.

The output oscillating means may be adapted to oscillate the slip control output of the slip control means at a predetermined period.

In one preferred form of this invention, the apparatus further comprises torque monitoring means which is operated during the slip control operation of the slip control means, for determining whether a torque transmitted through the lock-up clutch is smaller than a predetermined threshold. In this case, the output oscillating means oscillates the slip control output if the torque monitoring means determines that the torque is smaller than the predetermined threshold. The torque smaller than the threshold indicates that the vehicle is in a running condition wherein the target slip speed of the lock-up clutch is almost equal to the slip speed of the lock-up clutch which would be established when the lock-up clutch is placed in the fully released state. In this form of the invention, the slip control output of the slip control means is not oscillated during the entire period of the slip control operation, but is oscillated only while the torque transmitted through the lock-up clutch (transmission torque of the clutch) is smaller than the threshold value. Accordingly, the life expectancy of a control valve used in the slip control means for controlling the pressure difference of the lock-up clutch is improved.

In one advantageous arrangement of the above preferred form of the invention, the torque monitoring means comprises an idling position switch for detecting an engine idling position of a throttle valve for idling an engine of the vehicle, and the output oscillating means oscillates the slip control output for a predetermined length of time after the idling position switch has detected the engine idling position of the throttle valve. When the throttle valve is placed in the engine idling position, the transmission torque of the lock-up clutch is considerably small. In this condition, the slip control output is oscillated for the limited length of time after the throttle valve is brought to the engine idling position. Thus, the life expectancy of the control valve for controlling the pressure difference of the lock-up clutch is further improved. Where the slip control output of the slip control means includes a learning control value in addition to a feed-forward control value and a feedback control values which are normally used, the predetermined length of time during which the slip control output is oscillated is determined so that the learning control value can be determined within that length of time. In this case, the slip control of the lock-up clutch can be effected with high stability even after the predetermined length of time has passed.

In another preferred form of the present invention, the apparatus further comprises deceleration monitoring means for determining whether a rate of deceleration of the vehicle is higher than a predetermined threshold. In this instance, the output oscillating means oscillates the slip control output if the deceleration monitoring means determines that the rate of deceleration is higher than the predetermined threshold. The vehicle running condition may enter the slip control area if the engine speed is suddenly lowered due to deceleration of the vehicle upon brake application, for example. In this condition, the target slip speed determined depending upon the vehicle running condition may be almost equal tot the slip speed of the lock-up clutch, and the pressure difference acting on the piston of the lock-up clutch is considerably small, whereby the piston is not highly responsive to a change in the slip control output. According to the present form of the invention wherein the slip control output is oscillated upon detection of the vehicle deceleration at a rate higher than the predetermined threshold, the thrust force acting on the clutch piston is oscillated, so as to permit smooth operation of the piston in response to the slip control output even when the pressure difference is considerably small.

In a further preferred form of the instant invention, the apparatus further comprises: slip speed calculating means operable upon initiation of the slip control operation of the slip control means, for calculating an slip speed of the lock-up clutch which is a difference between rotating speeds of the pump and turbine impellers of the fluid-filled power transmitting device; target slip speed determining means operable upon initiation of the slip control operation, for determining a target slip speed of the lock-up clutch; and slip speed monitoring means for determining whether the actual slip speed calculated by the slip speed calculating means is almost equal to the target slip speed determined by the target slip speed determining means. In this case, the output oscillating means oscillates the slip control output of the slip control means if the slip speed monitoring means determines that the actual slip speed is almost equal to the target slip speed. In a certain running condition of the vehicle, the target slip speed of the lock-up clutch may be almost equal to the actual slip of the lock-up clutch (speed difference of the pump and turbine impellers of the fluid-filled power transmitting device), even when the throttle valve is not placed in its engine idling position. In the present arrangement, such running condition of the vehicle is detected by comparing the actual slip speed and the target slip speed with each other, and the slip control output is oscillated when such running condition is detected, namely, when the pressure difference of the lock-up clutch is considerably small. Thus, the oscillation of the slip control output permits smooth movement of the piston with high response t the slip control output even when the pressure difference acting on the clutch piston is small.

BRIEF DESCRIPTION OF THE DRAWINGS

The above and optional objects, features, advantages and technical significance of the present invention will be better understood by reading the following detailed description of presently preferred embodiments of the invention, when considered in conjunction of the accompanying drawings, in which:

FIG. 2 is a table indicating a relationship between the operating positions of an automatic transmission connected to the torque converter and the respective combinations of the operating states of first and second solenoid-operated valves of the slip control apparatus;

DETAILED DESCRIPTION OF THE PREFERRED EMBODIMENTS

Figure 1:
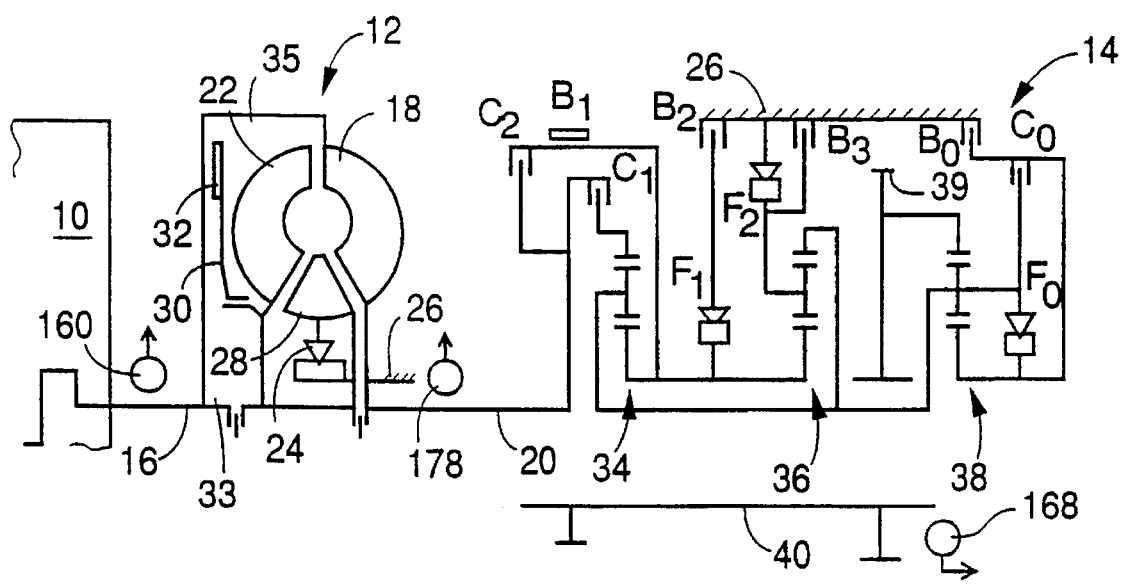
FIG. 1 is a schematic view illustrating a part of a power transmitting system of a motor vehicle, which incorporates a torque converter having a lock-up clutch to be controlled by a slip control apparatus constructed according to one embodiment of the present invention.

Referring first to the schematic view of FIG. 1, there is shown a part of a power transmitting system of a motor vehicle, wherein power generated by an engine 10 is transmitted to a differential gear device and drive wheels through a torque converter 12 equipped with a lock-up clutch 32, and an automatic transmission 14 which includes three planetary gear sets to selectively establish a plurality of operating positions (gear positions).

The torque converter 12 includes; a pump impeller 18 connected to a crankshaft 16 of the engine 10; a turbine impeller 22 fixed to an input shaft of the automatic transmission 14 and rotatable by the pump impeller 18; a stator impeller 28 fixed to a stationary member in the form of a housing 26 through a one-way clutch 24; and the above-indicated lock-up clutch 32 connected to the input shaft 20 through the turbine impeller 22. The pump impeller 18 includes a radially outer portion which is U-shaped in cross section, and a plurality of curved vanes which are arranged in the circumferential direction and formed so as to cause a flow of a working oil, which flow includes a component moving toward the turbine impeller 22 on the side of the engine 10. The turbine impeller 22 includes a plurality of curved vanes opposed to the vanes of the pump impeller 18. In operation of the torque converter 12, the turbine impeller 22 is rotated by the oil flow from the vanes of the pump impeller 18 rotated by the engine 10. The lock-up clutch 32 includes a piston 30 which engages a hub of the turbine impeller 22 such that the piston 30 is axially slidable relative to and rotatable with the turbine impeller 22.

The piston 30 of the lock-up clutch 32 divides an interior of the torque converter 12 into two oil chambers 33 and 35. The lock-up clutch 32 is released and engaged by axial movements of the piston 32 depending upon a difference between oil pressures in these two oil chambers 33, 35, which will be hereinafter referred to as a releasing oil chamber 33 and an engaging oil chamber 35, respectively.

Described more specifically, the piston 30 is retracted to its fully retracted position when the pressure in the releasing oil chamber 33 is increased while the engaging oil chamber 35 is drained. When the pressure in the engaging oil chamber 35 is increased while the releasing oil chamber 33 is held at the lowest level, the piston 30 is advanced to its fully advanced position. In the fully retracted position of the piston 30, the lock-up clutch 32 is placed in its fully released position in which the torque received by the pump impeller 18 is amplified or boosted at a ratio depending upon the ratio of the input and output speeds of the torque converter 12. In the fully advanced position of the piston 30, the lock-up clutch 32 is placed in the fully engaged position in which the frictional coupling portion of the clutch 32 is forced against the radially outer U-shaped portion of the pump impeller 18, whereby the pump impeller 18 is directly connected to the input shaft 20, that is, the crankshaft 16 as an input member of the torque converter 12 is directly connected to the input shaft 20 of the transmission 14, which serves as an output member of the torque converter 12. When the pressure in the releasing oil chamber 33 is increased to a predetermined level while the pressure in the engaging oil chamber 35 is held at a higher level, the piston 30 is advanced to a predetermined position in which the frictional coupling portion of the lock-up clutch is located near the corresponding coupling portion (radially outer U-shaped portion) of the pump impeller 18. The predetermined level of the pressure in the releasing oil chamber 33 indicated above is determined by a second term ("feed forward term") of a right member of an equation (2) which will be described.

The automatic transmission 14 includes: the input shaft 20, a first, a second and a third planetary gear set 34, 36, 38; an output gear 39 which rotates with a ring gear of the third planetary gear set 38; and an output shaft in the form of a counter shaft 40 which connects the output gear 39 and the differential gear device. The planetary gear sets 34, 36, 38 include components which are connected integrally with each other, and components which are connected to each other when three clutches C0, C1, C2 are selectively engaged. The planetary gear sets 34, 36, 38 also include components which are fixed or connected to the housing 26 and thereby inhibited from rotating when four brakes B0, B1, B2, B3 are selectively engaged. The planetary gear sets 34, 36, 38 further include components which are connected to each other or to the housing 26 through three one-way clutches F0, F1, F2, depending upon the rotating directions of the components.

Each of the clutches C0, C1, C2 and brakes B0, B1, B2, B3 may consist of a multiple-disk clutch, or a band brake which uses two bands wound in opposite directions. These clutches and brakes are operated by respective hydraulically operated actuators, which are controlled by an electronic transmission controller 184 shown in FIG. 3 (which will be described), so as to selectively establish a plurality of operating positions of the automatic transmission 14. That is, the automatic transmission 14 has four forward drive positions, first-speed ("1st"), second-speed ("2nd"), third-speed ("3rd") and overdrive ("O/D") positions, and one backward drive position "R", as indicated in FIG. 2. The four forward drive positions "1st", "2nd", "3rd" and "O/D" have respective different speed ratios I which decrease in the order of description. The speed ratio I is defined as the speed of the input shaft 20 divided by the speed of the counter shaft (output shaft) 40.

It is to be noted that the lower halves of the torque converter 12 and automatic transmission 14 and the upper half of the counter shaft 40 are not shown in FIG. 1 in the interest of simplification, since these elements 12, 14, 40 are symmetrical with respect to their axes of rotation.

Referring next to the block diagram of FIG. 3, there will be described a control system provided to control the engine 10, lock-up clutch 32 and automatic transmission 14 of the motor vehicle. The control system includes the electronic transmission controller 184 indicated above, which is adapted to control a hydraulic control device 44. The hydraulic control device 44 includes a transmission control circuit for shifting the automatic transmission 14 to an appropriate one of the operating positions, and a lock-up clutch control circuit for controlling the operating state of the lock-up clutch 32. The transmission control circuit is provided with a first and a second solenoid-operated valve S1, S2, which have respective solenoid coils. The clutches C0, C1, C2 and brakes B0, B1, B2, B3 are selectively engaged to selectively establish the operating positions ("1st", "2nd", "3rd" and "O/D") of the transmission 14, depending upon respective combinations of the operating states of the first and second solenoid-operated valves S1, S2, as indicated in FIG. 2. In this figure, "o" indicates the energization of the solenoid coils of the valves S1, S2 or the engagement of the clutches and brakes.

Figure 4:
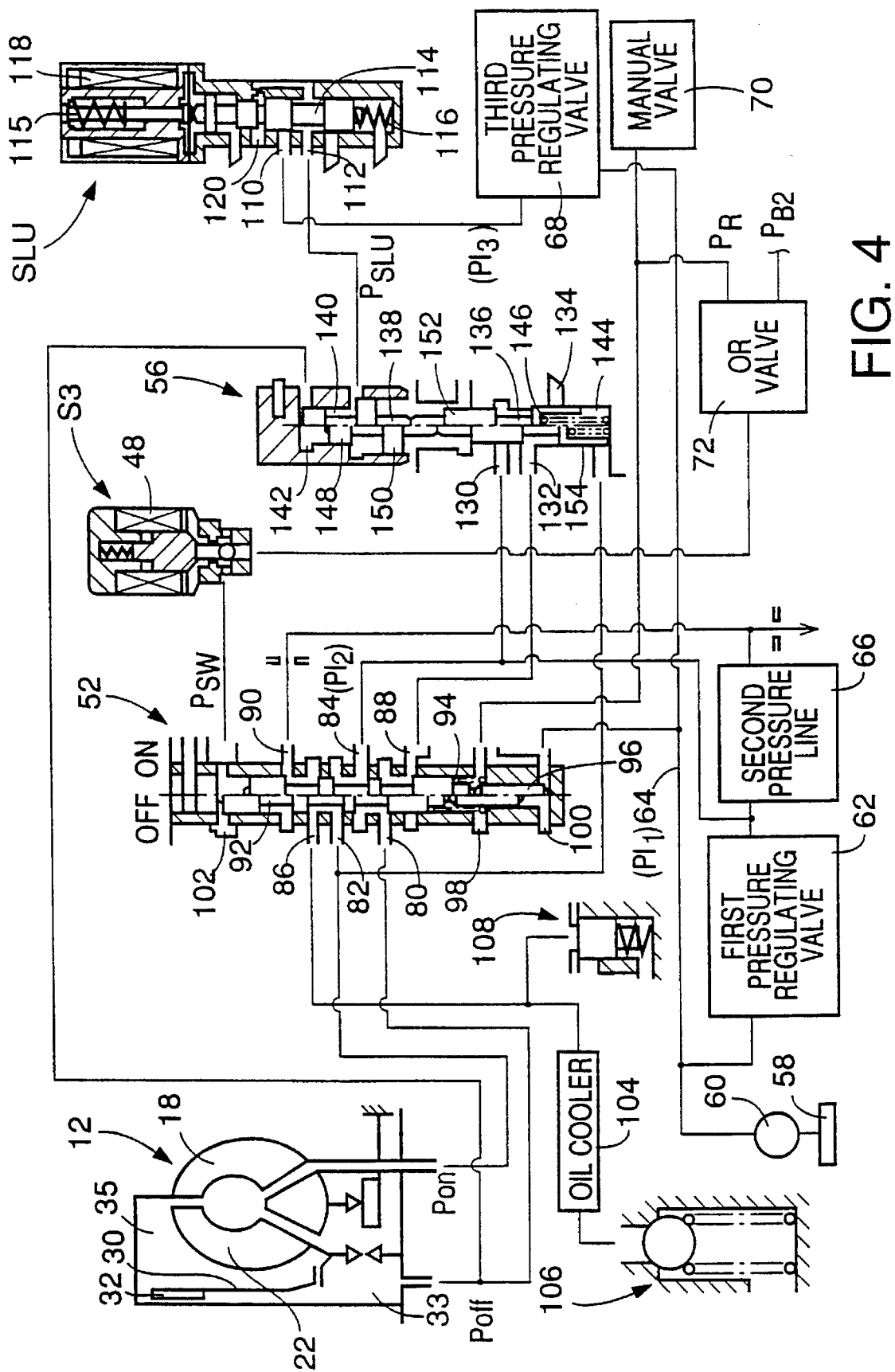
FIG. 4 is a view illustrating a part of a hydraulic control device shown in FIG. 3, which incorporates a circuit for controlling the lock-up clutch.
Figure 5:
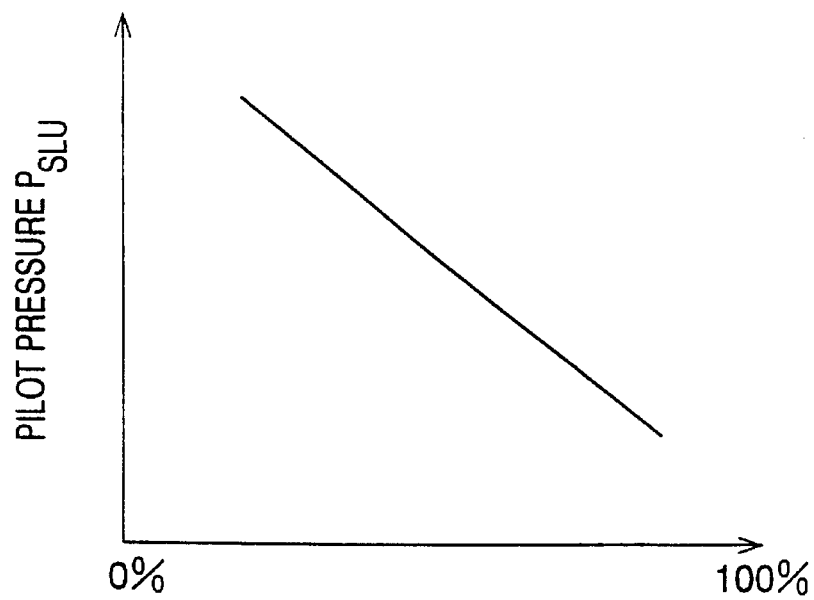
FIG. 5 is a graph indicating an output characteristic of a linear solenoid valve provided in the lock-up clutch control circuit of FIG. 4.

The lock-up clutch control circuit of the hydraulic control device 44 includes a third solenoid-operated valve S3, a lock-up relay valve 52, a linear solenoid valve SLU, and a lock-up clutch control valve 56, as shown in FIG. 4. The third solenoid-operated valve S3 has a solenoid coil 48 which is turned on and off. When the coil 48 is on, the valve 53 generates a LOCK-UP SWITCHING pressure $P_{SW}$. The lock-up relay valve 52 has a releasing state and an engaging state for releasing and engaging the lock-up clutch 32, respectively, depending upon whether the pilot pressure $P_{SW}$ is generated by the valve S3. The linear solenoid valve SLU is adapted to generate a SLIP CONTROL pilot pressure $P_{SLU}$ corresponding to a SLIP CONTROL current $I_{SLU}$ supplied from the transmission controller 184. The lock-up clutch control valve 56 is adapted to regulate a pressure difference $\Delta P$ between the pressures in the engaging and releasing oil chambers 35, 33 of the torque converter 12, according to the SLIP CONTROL pilot pressure $P_{SLU}$ received from the linear solenoid valve SLU, for thereby controlling an amount of slip of the lock-up clutch 32.

As shown in FIG. 4, the hydraulic control device 44 includes a pump 60 for pressuring a working oil sucked from a suitable reservoir through a strainer 58. The pump 60 is driven by the engine 10. The pressure of the oil delivered by the pump 60 is adjusted to a first line pressure Pl1 by a first pressure regulating valve 62 of an overflow type. The first pressure regulating valve 62 is arranged to receive a THROTTLE pilot pressure indicative of an opening TAP of a first throttle valve 166 (FIG. 3), and regulate the first line pressure Pl1 in a first pressure line 64 such that the pressure Pl1 increases with the THROTTLE pilot pressure. The hydraulic control device 44 further has a second pressure regulating valve 66 of an overflow type, which is adapted to regulate the pressure of the oil received from the first pressure regulating valve 62, to a second line pressure Pl2 according to the THROTTLE pressure, so that the second line pressure Pl2 $^{corresponds}$ to the output torque of the engine 10. The device 44 further has a third pressure regulating valve 68, which is a pressure reducing valve adapted to reduce the first line pressure Pl1 to a predetermined third line pressure Pl3.

The motor vehicle has a shift lever 174 (FIG. 3) which has six operating positions "P" (PARKING), "R" (REVERSE), "N" (NEUTRAL), "D" (DRIVE), "S" (SECOND) and "L" (LOW), as indicated in FIG. 2. The hydraulic control device 44 includes a manual valve 70 (FIG. 4) adapted to generate a REVERSE pressure $P_R$ when the shift lever 174 is placed in the REVERSE position "R" (which is the backward drive position referred to above with respect to the automatic transmission 14). The device 44 also includes an OR valve 72 which is adapted to generate a higher one of a BRAKE B2 pressure $P_{B2}$ and the REVERSE pressure $P_R$, which serves as the LOCK-UP SWITCHING pilot pressure $P_{SW}$ generated when the valve S3 is turned ON as explained below in detail. The BRAKE B2 pressure $P_{B2}$ is generated to engage the brake B2 for establishing the second-speed ("2nd"), third-speed ("3rd") and overdrive ("O/D") positions.

The lock-up relay valve 52 has: a releasing port 80 communicating with the releasing oil chamber 33; an engaging port 82 communicating with the engaging oil chamber 35; an input port 84 adapted to receive the second line pressure Pl2; a first drain port 86 through which the oil in the engaging oil chamber 35 is discharged when the lock-up clutch 32 is released; a second drain port 88 through which the oil in the releasing oil chamber 33 is discharged when the lock-up clutch 32 is engaged; a supply port 90 adapted to receive the oil discharged from the second pressure regulating valve 66 so that the oil is cooled during engagement of the lock-up clutch 32; a spool 92 operable between an ON position and an OFF position, for switching the mutual communication or connection of the ports indicated above; a spring 94 for biasing the spool 92 toward the OFF position; a plunger 96 abuttable on the end of the spool 92 on the side of the spring 94; an oil chamber 98 defined between the above-indicated end of the spool 92 and the opposed end of the plunger 96, and adapted to receive the REVERSE pressure $P_R$ from the manual valve 70; an oil chamber 100 partially defined by the other end of the plunger 96 and adapted to receive the first line pressure Pl1; and an oil chamber 102 partially defined by the other end of the spool 92 and adapted to receive the LOCK-UP SWITCHING pressure $P_{SW}$ from the third solenoid-operated valve S3, for generating a thrust force for moving the spool 92 toward the ON position.

The third solenoid-operated valve S3 has a ball which is seated on a valve seat to disconnect a line communicating with the oil chamber 102 of the lock-up relay valve 52 and the OR valve 72 when the solenoid coil 48 is de-energized or OFF. In this state, the LOCK-UP SWITCHING pilot pressure $P_{SW}$ is not applied to the oil chamber 102. When the coil 48 is energized or ON, the ball is unseated to permit the communication between the OR valve 72 and the oil chamber 102, whereby the LOCK-UP SWITCHING pressure $P_{SW}$ is applied to the oil chamber 102. In the OFF state of the valve S3, therefore, the spool 92 of the lock-up relay valve 52 is moved to its OFF position by the biasing force of the spring 94 and a force based on the first line pressure Pl1 in the oil chamber 100, whereby the input port 84 communicates with the releasing port 80 while the first drain port 86 communicates with the engaging port 82. As a result, a pressure Poff in the releasing oil chamber 33 is made higher than a pressure Pon in the engaging oil chamber 35, to thereby release the lock-up clutch 32, while at the same time the engaging chamber 35 is drained through the first drain port 86, an oil cooler 104 and a check valve 106.

In the ON state of the valve S3, on the other hand, the LOCK-UP SWITCHING pilot pressure $P_{SW}$ is applied to the oil chamber 102, and the spool 92 is moved by a force based on the pressure $P_{SW}$ against the biasing force of the spring 94 and the force based on the first line pressure Pl1 in the oil chamber 100, whereby the input port 84 communicates with the engaging port 82 while the first and second drain ports 86, 88 communicate with the supply and releasing ports 90, 80, respectively. As a result, the pressure Pon in the engaging oil chamber 35 is made higher than the pressure Poff in the releasing oil chamber 33, to thereby engage the lock-up clutch 32, while at the same time the releasing oil chamber 33 is drained through the second drain port 88 and the lock-up clutch control valve 56.

The linear solenoid valve SLU is a reducing valve adapted to reduce the predetermined third line pressure Pl3 to the SLIP CONTROL pilot pressure $P_{SLU}$, such that the pilot pressure $P_{SLU}$ increases with an increase in the SLIP CONTROL current $I_{SLU}$ supplied from the transmission controller 184, namely, increases with an increase in a duty ratio $D_{SLU}$ of the linear solenoid valve SLU. The thus controlled pilot pressure $P_{SLU}$ is applied to the lock-up clutch control valve 56. The linear solenoid valve SLU has: a supply port 110 adapted to receive the third line pressure Pl3; an output port 112 from which the SLIP CONTROL pilot pressure $P_{SLU}$ is applied to the valve 56; a spool 114 for closing and opening the ports 110, 112; a spring 115 for biasing the spool 114 in a valve closing direction; a spring 116 for biasing the spool 114 in a valve opening direction by a force smaller than that of the spring 115; a solenoid coil 118 for biasing the spool 114 in the valve opening direction by a force determined by the SLIP CONTROL current $I_{SLU}$; and an oil chamber 120 adapted to receive a feedback pressure (SLIP CONTROL pilot pressure $P_{SLU}$) which biases the spool 114 in the valve closing direction. The spool 114 is moved to a position of equilibrium between a sum of the biasing forces of the solenoid coil 118 and the spring 116 and a sum of the biasing force of the spring 115 and a force based on the feedback pressure $P_{SLU}$.

The lock-up clutch control valve 56 has: a line pressure port 130 adapted to receive the second line pressure Pl2; an input port 132 adapted to receive the oil discharged from the releasing oil chamber 33 through second drain port 88 of the valve 52; a drain port 134 through which the oil received by the input port 132 is discharged; a spool 136 operable between a first position (indicated at left in FIG. 4) and a second position (indicated at right in FIG. 4); a plunger 138 abuttable on the spool 136 for biasing the spool 136 toward the first position; an oil chamber 140 adapted to receive the SLIP CONTROL pilot pressure $P_{SLU}$ for biasing the plunger 138 so as to generate a thrust force which biases the spool 136 toward the first position; an oil chamber 142 adapted to receive the oil pressure Poff in the releasing oil chamber 33, for biasing the plunger 138 so as to generate a thrust force which biases the spool 136 toward the first position; an oil chamber 144 adapted to receive the oil pressure Pon in the engaging oil chamber 35, for generating a thrust force for biasing the spool 136 toward the second position; and a spring 146 received in the oil chamber 144, for biasing the spool 136 toward the second position.

In the first position of the spool 136 of the lock-up clutch control valve 56, the input port 132 communicates with the drain port 134 to cause the releasing oil chamber 33 to be drained, for thereby increasing the pressure difference ΔP(= Pon−Poff) of the oil chambers 33, 35. In the second position of the spool 136, the input port 132 communicates with the line pressure port 130 to cause the second line pressure Pl2 to be applied to the releasing oil chamber 33, for thereby reducing the pressure difference ΔP.

Figure 6:
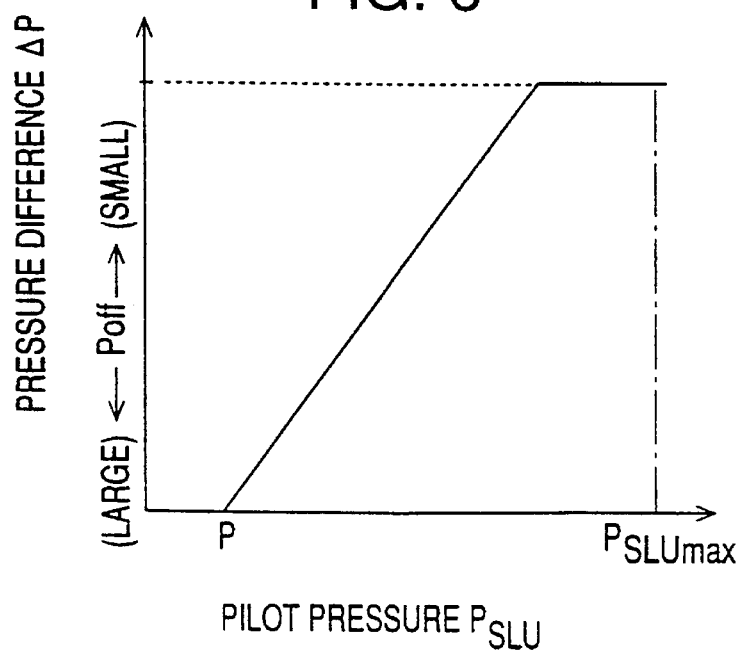
FIG. 6 is a graph indicating an output characteristic of a lock-up clutch control valve provided in the lock-up clutch control circuit of FIG. 4, namely, a relationship between a pilot pressure $P_{SLU}$ received by the lock-up clutch control valve and a pressure difference $\Delta P$ of engaging and releasing oil chambers of the lock-up clutch.

The plunger 138 has a first land 148 adjacent to the oil chamber 142, and a second land 150 remote from the oil chamber 142. The first land 148 has a cross sectional area A1, and the second land 150 has a cross sectional area A2 larger than the area A1. The spool 136 has a third land 152 adjacent to the pilot pressure oil cheer 140, and a fourth land 154 remote from the oil chamber 140. The third land 152 has a cross sectional area A3, and the fourth land 154 has a cross sectional area equal to the cross sectional area A1. In this arrangement of the lock-up clutch control valve 56, the plunger 138 and the spool 136 are moved together as a unit with the plunger 138 held in abutting contact with the spool 136. With the movement of the plunger and spool 138, 136, the pressure difference ΔP(=Pon−Poff) on the opposite sides of the piston 30 of the lock-up clutch 32 is controlled depending upon the SLIP CONTROL pilot pressure $P_{SLU}$ generated by the linear solenoid valve SLU. The pressure difference ΔP changes with the pilot pressure $P_{SLU}$ as shown in FIG. 6, at a rate or gradient 10 represented by a value (A2−A1)/A1 included in the following equation (1):

$$\Delta P = Pon - Poff = [(A2-A1)/A1]P_{SLU} - Fs/A1 \quad (1)$$

where,

Fs: biasing force of the spring 146.

The graph of FIG. 6 indicates the output characteristic of the lock-up clutch control valve 56, namely, the relationship between the pressure difference ΔP generated by the valve 56 and the SLIP CONTROL pilot pressure $P_{SLU}$ generated by the valve SLU. While the lock-up clutch control valve 56 is ON with the spool 136 placed in the first position, an increase in the pilot pressure $P_{SLU}$ results in an increase in the pressure difference ΔP of the engaging and releasing oil chambers 35, 33, and thereby causes a decrease in a slip speed $N_{SLP}$ of the lock-up clutch 32, while a decrease in the pilot pressure $P_{SLU}$ causes an increase in the slip speed $N_{SLP}$. The slip speed $N_{SLP}$ is a difference $(N_P-N_T)$ between a speed $N_P$ of the pump impeller 18 (speed $N_E$ of the engine 10) and a speed $N_T$ of the turbine impeller 22 (speed Nin of the input shaft 20).

Figure 3:
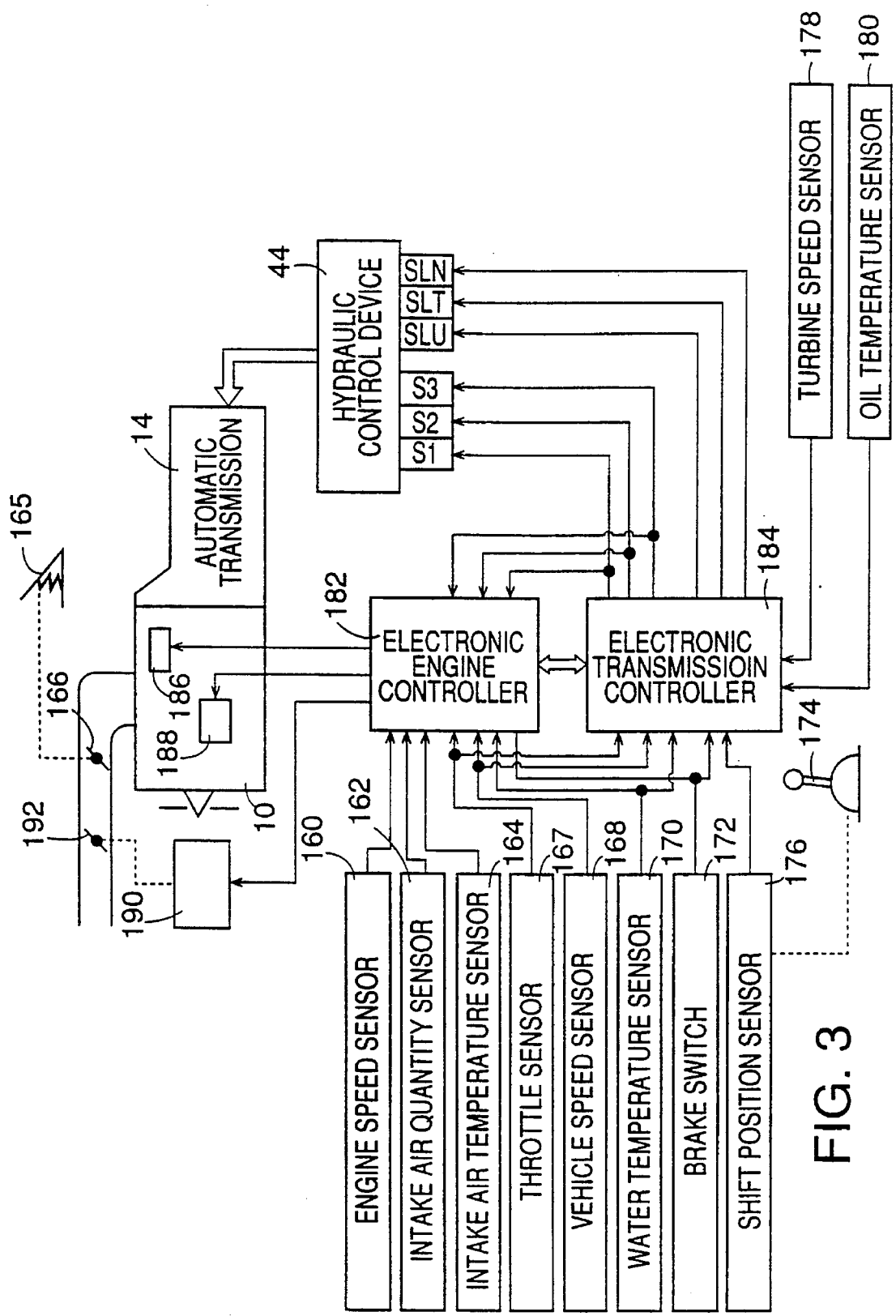
FIG. 3 is a block diagram showing a control system for the motor vehicle, which includes a transmission controller incorporating the slip control apparatus for the lock-up clutch.

Referring back to the block diagram of FIG. 3, the motor vehicle has various sensors and switches including: an engine speed sensor 160 for detecting the speed $N_E$ of the engine 10, that is, speed $N_P$ of the pump impeller 18; an intake air quantity sensor 162 for detecting a quantity Q of an intake air sucked into the engine 10 through an intake pipe; an intake air temperature sensor 164 for detecting a temperature $T_{AIR}$ of the intake air; a throttle sensor 167 for detecting the opening TAP of the first throttle valve 166 operated by an accelerator pedal 165, the throttle sensor 167 being equipped with an idling position switch for detecting the idling position of the throttle valve 166; a vehicle speed sensor 168 for detecting a running speed V of the vehicle on the basis of a speed Nout of the output shaft 40 of the automatic transmission 40; a water temperature sensor 170 for detecting a temperature $T_{WA}$ of a coolant water of the engine 10; a brake switch 172 for detecting an operation of a brake pedal; a shift position sensor 176 for detecting a currently selected operating position Ps of the automatic transmission 40, namely, a currently selected one of the operating positions "L", "S", "D", "N", "R" and "P" of the shift lever 174; a turbine speed sensor 178 for detecting the speed $N_T$ of the turbine impeller 22, that is, the speed Nin of the input shaft 20 of the transmission 20; and an oil temperature sensor 180 for detecting a temperature $T_{OIL}$ of the working oil in the hydraulic control device 44. The output signals generated by the above sensors and switch are applied directly or indirectly to an electronic engine controller 182 and the electronic transmission controller 184. The two controllers 182, 184 are connected to each other by a communication interface, for applying the necessary signals to each other.

The transmission controller 184 is comprised of a so-called microcomputer incorporating a central processing unit (CPU), a read-only memory (ROM), a random-access memory (RAM) and an interface. The CPU processes the input signals according to various control programs stored in the ROM, while utilizing a temporary data storage function of the RAM, for controlling the automatic transmission 14 and the lock-up clutch 32 by controlling the first, second and third solenoid-operated valves S1, S2, S3 and the linear solenoid valve SLU.

For controlling the automatic transmission 14 so as to shift the transmission 14 to the appropriate operating position, a plurality of shift patterns are stored in the ROM, and one of the shift patterns which corresponds to the currently selected position of the transmission 14 is selected to determine the operating position (one of the four forward drive positions) to which the transmission 14 should be shifted down or up. For instance, each shift pattern consists of a shift-down boundary line and a shift-up boundary line which are relationships between the throttle valve opening TAP and the vehicle speed V. On the basis of the determined forward drive position to which the transmission 14 should be shifted, the solenoid-operated valves S1 and S2 are suitably controlled (with their solenoid coils being suitably energized or de-energized), so as to establish an appropriate combination of the operating states of the clutches and brakes C0, C1, C2, B0, B1, B2, B3, which combination corresponds to the determined forward drive position.

Figure 7:
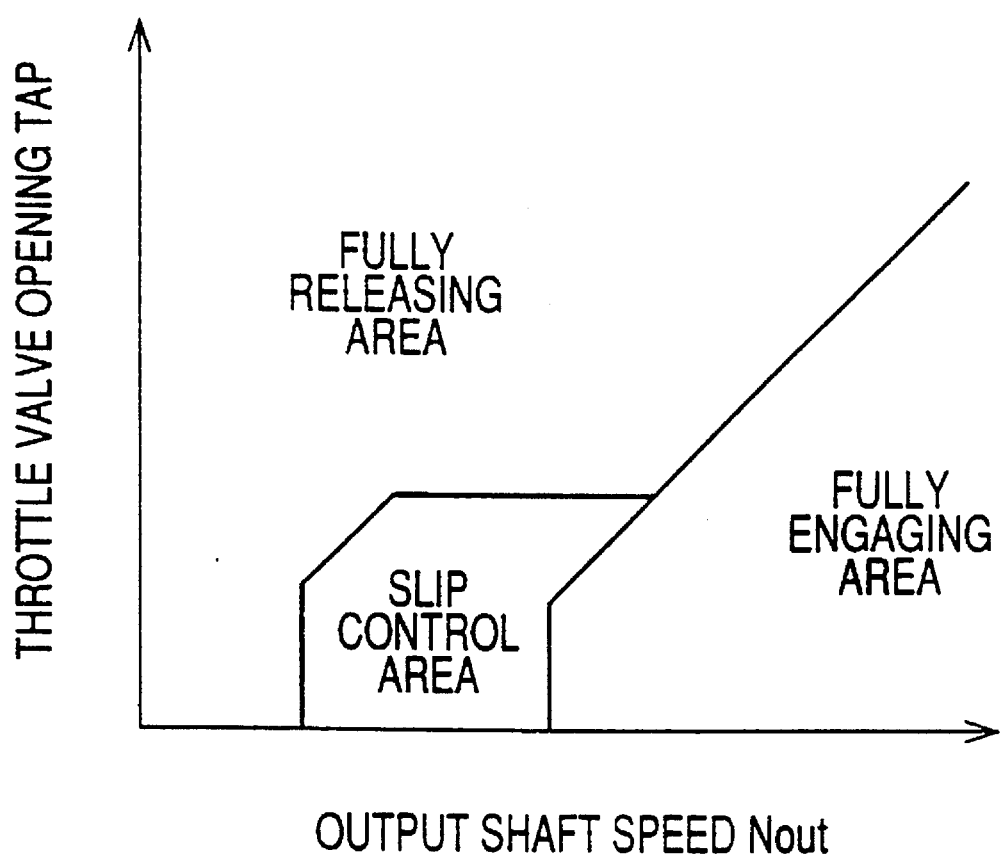
FIG. 7 is a view indicating boundaries defining different control areas of the lock-up clutch in relation to the running condition of the vehicle, which boundaries are stored in the slip control apparatus shown in FIG. 3.

The transmission controller 184 is adapted to control the lock-up clutch 32 in the manner explained below, when the vehicle is running with the transmission 14 placed in the third-speed or fourth-speed or overdrive position ("3rd" or "O/D"), for example. For controlling the lock-up clutch 32 differently depending upon the running condition of the vehicle, predetermined boundaries defining three different control areas as indicated in FIG. 7 are stored in the ROM. For instance, the boundaries are relationships between the throttle valve opening TAP and the output speed Nout of the output shaft 40 of the transmission 14 (vehicle speed V). Described more specifically, these boundaries define a fully releasing area in which the lock-up clutch 32 should be fully released, a fully engaging area in which the clutch 32 should be fully engaged, and a slip control area in which the amount of slip of the clutch 32 should be suitably controlled according to the principle of the present invention as described below in detail. Depending upon the currently detected throttle opening TAP and output speed Nout, one of the three control areas is determined or selected by the CPU of the transmission controller 184, according to the boundaries stored in the ROM.

When the vehicle running condition (TAP and Nout) is in the slip control area, the lock-up clutch 32 is controlled to be held in a partially slipping state for transmitting power of the engine 10 to the automatic transmission 14 so as to maximize the fuel economy of the vehicle while absorbing a torque variation of the engine 10 to assure high drivability of the vehicle. The determination as to whether the vehicle running condition falls in the slip control area according to the boundaries of FIG. 7 stored in the ROM is effected while the vehicle is accelerating. In this respect, it is noted that the amount of slip of the lock-up clutch 32 is also controlled while the vehicle is coasting or decelerating with the throttle valve 166 placed in the idling position. This slip control is effected to increase an effect of the fuel-cut control of the engine 10. In this case, however, the slip control area is determined on the basis of only the vehicle speed V, since the throttle opening TAP is zero during the coasting of the vehicle.

If the CPU of the controller 184 determines that the vehicle running condition falls in the fully engaging area, the solenoid coil of the third solenoid-operated valve S3 is energized to turn ON the lock-up relay valve 52, and the SLIP CONTROL current $I_{SLU}$ applied to the linear solenoid valve SLU is reduced to the minimum value, whereby the lock-up clutch 32 is fully engaged. If the vehicle running condition is determined to be in the fully releasing area, the solenoid coil of the valve S3 is de-energized to turn OFF the lock-up relay valve 52, so that the lock-up clutch 32 is fully released irrespective of the SLIP CONTROL current $I_{SLU}$. If the vehicle running condition is determined to be in the slip control area, the solenoid coil of the valve S3 is energized to turn ON the lock-up relay valve 52, and the SLIP CONTROL current $I_{SLU}$ to be applied to the valve SLU, namely, a duty ratio $D_{SLU}$ of the valve SLU is adjusted according to the following equation (2) to control the amount of slip of the lock-up clutch 32 in a slip control mode:

$$D_{SLU} (=I_{SLU})=DFWD+KGD+DFB+tDITH \qquad (2)$$

For instance, the duty ratio $D_{SLU}$ is calculated to zero an error $\Delta E$ ($=N_{SLP}-TN_{SLP}$) between a target slip speed $TN_{SLP}$ and the actual slip speed $N_{SLP}$ ($=N_E-N_T$) of the lock-up clutch 32. The first term DFWD of the right member of the above equation (2) is a feed-forward control value, which varies as a function the output torque of the engine 10, for example. The second term KGD is a learning control value which changes so as to reflect the varying characteristics of the lock-up clutch 32. The third term DFB is a feedback control value consisting of a proportional value, a differential value and an integral value of the control error $\Delta E$. The fourth term tDITH is an oscillation value (which will be described) for eliminating a delay of the engagement force of the lock-up clutch 32 which would occur when the pressure difference $\Delta P=Pon-Poff$ is relatively small.

The feedback control value DFB is obtained according to the following equation (3):

$$DFB=K_p[\Delta E+(1/T1)\Delta Edt+T_D(d\Delta E/dt)] \qquad (3)$$

The electronic engine controller 182 is comprised of a microcomputer similar to that of the transmission controller 184, which has a CPU adapted to process the input signals according to programs stored in a ROM while utilizing a temporary data storage function of a RAM, for controlling the engine 10, more specifically, for effecting a fuel injection control for controlling a fuel injection valve 186 so as to optimize the combustion condition of the engine 10, an ignition control for controlling an ignitor 188 so as to optimize the ignition timing, a traction control for controlling a second throttle valve 192 via a throttle actuator 190 so as to control the traction force of the vehicle while preventing slipping of the drive wheels on the road surface, and a fuel-cut control for holding the fuel injection valve 186 closed while the engine speed $N_E$ is higher than a predetermined fuel-cut threshold level $N_{CUT}$ during coasting of the vehicle, so that the fuel economy of the vehicle is improved.

Figure 8:
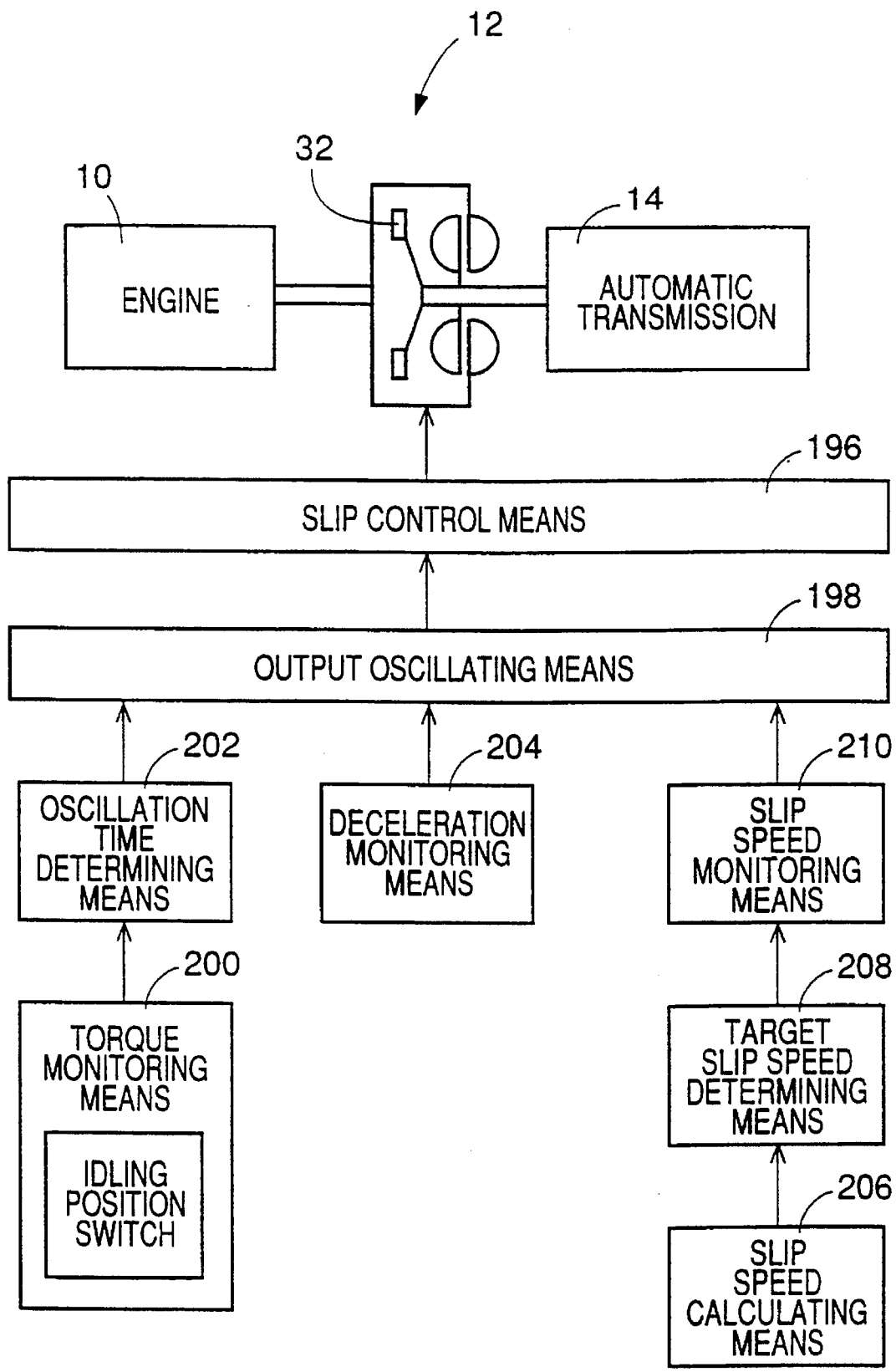
FIG. 8 is a block diagram illustrating the functions of various functional means incorporated in the slip control apparatus.

Referring next to the block diagram of FIG. 8, there will be described the functions of various functional means provided in a slip control apparatus, which is primarily constituted by the electronic transmission controller 184. The slip control apparatus incorporates slip control means 196, output oscillating means 198, torque monitoring means 200, oscillation time determining means 202, deceleration monitoring means 204, slip speed calculating means 206, target slip speed determining means 208, and slip speed monitoring means 210.

When the vehicle running condition is determined to fall in the slip control area explained above by reference to FIG. 7, the slip control means 196 provides a slip control output in the form of the SLIP CONTROL current $I_{SLU}$ (=duty ratio $D_{SLU}$) calculated according to the above equation (2), to control the amount of slip of the lock-up clutch 32 in the slip control mode, so that the actual slip speed $N_{SLP}$ ($N_E$–$N_T$) coincides with the target slip speed $TN_{SLP}$. The output oscillating means 198 is adapted to oscillate the slip control output $I_{SLU}$ or $D_{SLU}$ at a predetermined period or interval, without oscillating the piston 30, while the slip control means 196 is in operation. The torque monitoring means 200 is adapted to determine whether the torque transmitted through the lock-up clutch 32 (hereinafter referred to as "transmission torque of the clutch 32) is smaller than a predetermined threshold during operation of the slip control means 196. The transmission torque of the lock-up clutch 32 smaller than the predetermined threshold indicates a vehicle running condition in which the target speed $TN_{SLP}$ determined by the running condition according to a predetermined relationship (described below) is almost equal to a speed difference ($N_P$–$P_T$) of the torque converter 12 (=slip speed $N_{SLP}$ of the clutch 32), which would be established or exist when the clutch 32 is placed in the fully released state. In this specific condition, the target slip speed $TN_{SLP}$ can be attained by a small change in the slip control output $D_{SLU}$ or $I_{SLU}$ of the slip control means 196. In other words, the pressure difference ΔP and the engagement force of the lock-up clutch 32 are so small that the piston 30 is not highly responsive to a change in the slip control output $D_{SLU}$. This specific condition wherein the transmission torque of the clutch 32 is relatively small may be, for example: a condition in which the idling position switch of the throttle sensor 167 is in the ON position (the throttle valve 166 is in the engine idling position); a condition in which the amount of opening TAP of the throttle valve 166 is smaller than a predetermined threshold; and a condition in which the speed difference of the torque converter 12 (slip speed $N_{SLP}$ of the lock-up clutch 32) when the vehicle running state has just entered the slip control area of FIG. 7 is almost equal to the determined target slip speed $TN_{SLP}$.

If the torque monitoring means 200 determines that the transmission torque of the lock-up clutch 32 is smaller than the predetermined threshold, the output oscillating means 198 oscillates the slip control output of the slip control means 196 for a length of time determined by the oscillation time determining means 202. The deceleration monitoring means 204 determines whether the deceleration of the vehicle is higher than a predetermined threshold. If the deceleration monitoring means 204 determines that the vehicle deceleration is higher than the predetermined threshold, the output oscillating means 198 oscillates the slip control output of the slip control means 196 at the predetermined period.

The slip speed calculating means 206 is adapted to calculate the slip speed $N_{SLP}$ (=$N_P$–$N_T$) of the torque converter 12 (speed difference between the pump and turbine impellers 18, 22) prior to the initiation of the slip control of the lock-up clutch 32 by the slip control means 196. The target slip speed determining means 208 determines the target slip speed $TN_{SLP}$ used in the slip control by the slip control means 196. The slip speed monitoring means 210 determines whether the target slip speed $TN_{SLP}$ determined by the target slip speed determining means 208 is almost equal to the slip speed $N_{SLP}$ calculated by the slip speed calculating means 206. If the slip speed monitoring means 210 determines that the target slip speed $TN_{SLP}$ and the slip speed $N_{SLP}$ are almost equal to each other, the output oscillating means 198 oscillates the slip control output of the slip control means 196 at the predetermined period.

Referring to the flow chart of FIG. 9, there will be described a routine executed by the slip control apparatus when the lock-up clutch 32 is placed in the fully released position.

The routine is initiated with step SE1 to determine whether conditions for initiating the slip control of the lock-up clutch 32 by the slip control means 196 are satisfied. If a negative decision (NO) is obtained in step SE1, the control flow goes to step SE7 to inhibit the slip control of the lock-up clutch 32. If an affirmative decision (YES) is obtained in step SE1, the control flow goes to step SE2 corresponding to the torque monitoring means 200, to determine whether the idling position switch of the throttle sensor 167 is in the ON position, that is, whether the throttle valve 166 is placed in the engine idling position.

Figure 10:
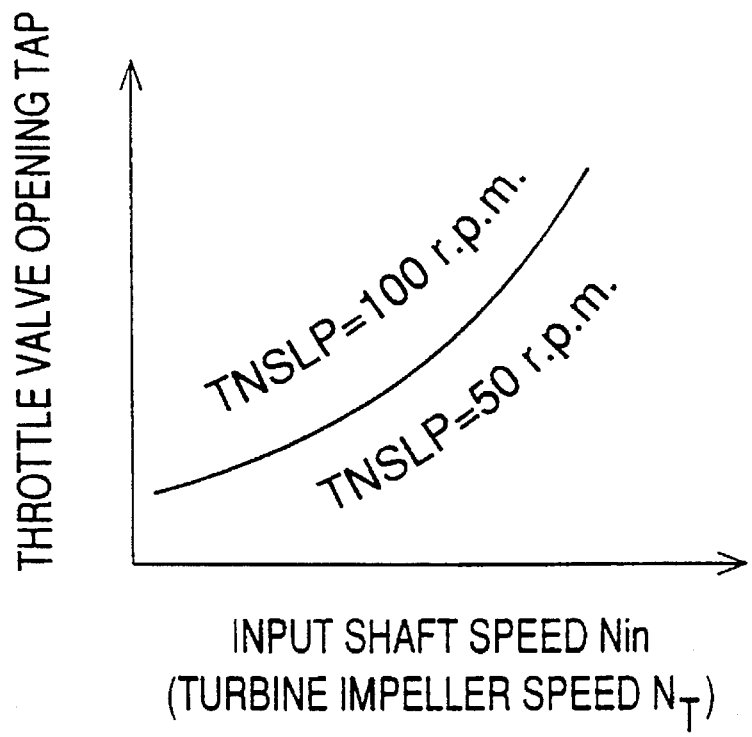
FIG. 10 is a graph indicating a predetermined relationship used to determine a target slip speed $TN_{SLP}$ of the lock-up clutch.

If a negative decision (NO) is obtained in step SE2, it means that the transmission torque of the lock-up clutch 32 is not smaller than the predetermined threshold. In this case, step SE8 is implemented to reset a time counter CLLONX to "0", and step SE6 is then implemented to initiate the slip control of the clutch 32 by the slip control means 196. It will be understood that step SE6 corresponds to the slip control means 196. In the slip control in step SE6, the target slip speed $TN_{SLP}$ is determined on the basis of the detected throttle opening angle TAP and the detected input speed Nin of the automatic transmission 14 (detected turbine impeller speed $N_T$ of the torque converter 12), and according to a predetermined relationship between the target slip speed $TN_{SLP}$ and the detected throttle opening TAP and speed Nin (=$N_T$), as indicated in the graph of FIG. 10. This relationship is represented by a data map stored in the ROM of the transmission controller 184. In step SE6, the control error ΔE (=$TN_{SLP}$–$N_{SLP}$) is calculated, and then the slip control output in the form of the SLIP CONTROL current $I_{SLU}$ (=duty ratio $D_{SLU}$) is calculated according to the above equation (2), so that the amount of slip of the lock-up clutch 32 is controlled according to the calculated slip control output $I_{SLU}$, so as to zero the control error ΔE.

If an affirmative decision (YES) is obtained in step SE2, it means that the transmission torque of the lock-up clutch 32 is smaller than the predetermined threshold, and that the vehicle is in deceleration or is going to be in deceleration. In this case, the pressure difference and the engagement force of the lock-up clutch 32 are small, and the actual slip speed $N_{SLP}$ of the lock-up clutch 32 is not highly responsive to a change in the slip control output $D_{SLU}$ of the slip control means 196, due to a sliding resistance of the clutch piston 30 and an oil leakage from the hydraulic system, whereby the feedback control of the slip speed $N_{SLP}$ tends to suffer from a control hunting. In view of this drawback, step SE6 corresponding to the slip control means 198 is implemented to initiate the slip control of the lock-up clutch 32 after steps SE3–SE5 are implemented. Steps SE3 and SE4 correspond to the oscillation time determining means 202, and step SE5 corresponds to the output oscillating means 198.

Described in detail, step SE3 is implemented to increment the time counter CLLONX to measure a time after the idling position switch is turned ON (after the affirmative decision is obtained in step SE2). Step SE3 is followed by step SE4 to determine whether the content of the time counter CLLONX is smaller than a predetermined threshold T, which is determined to be sufficient for the learning control value KGD in the equation (2) to be determined. For example, a threshold time corresponding to the predetermined threshold T is about six seconds.

Figure 11:
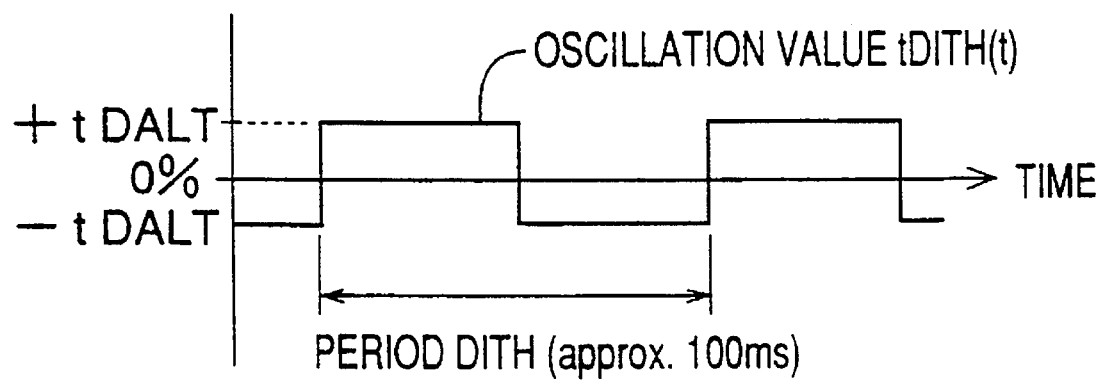
FIG. 11 is a time chart indicating a change of an oscillation value tDITH for oscillating a slip control output $D_{SLU}$ of the slip control apparatus for controlling the lock-up clutch.

An affirmative decision (YES) is obtained in step SE4 until the time corresponding to the threshold value T has passed. In this case, step SE5 is implemented to determine the oscillation value tDITH(t) included in the above equation (2). The oscillation value tDITH(t) is represented by a pulse which has a frequency of about 10 Hz and a predetermined amplitude tDALT, as indicated in the graph of FIG. 11. This amplitude tDALT is determined in step SE5, so as to be generally within a range of 0.3–3%, preferably 0.5–2%, and more preferably in the neighborhood of 1%. These percent values correspond to the percent value of the duty cycle $D_{SLU}$. Step SE5 is followed by step SE6. With steps SE5 and SE6 repeatedly implemented until a negative decision (NO) is obtained in step SE4, the slip control output $I_{SLU}$ or $D_{SLU}$ as calculated according to the above equation (2) which includes the oscillation value tDITH(t) determined in step SE5 is oscillated at a frequency of 5–20 Hz, preferably 7–15 Hz and more preferably about 10 Hz. When the predetermined time (about six seconds) has passed after the idling position switch is turned ON, the negative decision (NO) is obtained in step SE4, and step SE6 is implemented without implementation of step SE5. In this case, the time counter CLLONX is reset in step SE8. Thus, the amplitude tDALT of the oscillation value tDITH(t) in the equation (2) is set within the range indicated above for the predetermined length of time corresponding to the threshold value T, and is set to be zero after the predetermined time has passed. Accordingly, the overall slip control output $D_{SLU}$ is oscillated by the oscillation value tDITH within the predetermined time.

Since the oscillation value tDITH(t) has a period TDITH of about 100 ms, the slip control output in the form of the duty ratio $D_{SLU}$ is oscillated at the predetermined frequency of about 10 Hz as indicated above. This frequency of oscillation of the slip control output is determined by experiments, so as to oscillate the pressure difference ΔP of the piston 30 for smooth operation of the piston 30 irrespective of the sliding resistance, and without vibrating the piston 30 per se. In this respect, it is noted that the slip control output of the slip control means 196 may be oscillated for the purse of assuring smooth movement of the spool 114 of the linear solenoid valve SLU even in the presence of some foreign matters mixed in the working fluid. In other words, the slip control output is oscillated at a predetermined frequency of about 30 Hz, for oscillating the thrust force of the spool 114 without vibrating the SLIP CONTROL pilot pressure $P_{SLU}$. Thus, the purpose and frequency of the oscillation of the thrust force of the spool 114 are different from those of the oscillation value tDITH(t) according to the principle of the present invention. The amplitude tDALT of the oscillation value tDITH(t) is also determined by experiments, so as to oscillate the pressure difference ΔP of the piston for smooth operation of the piston 30 irrespective of the sliding resistance and without vibrating the piston 30.

Figure 9:
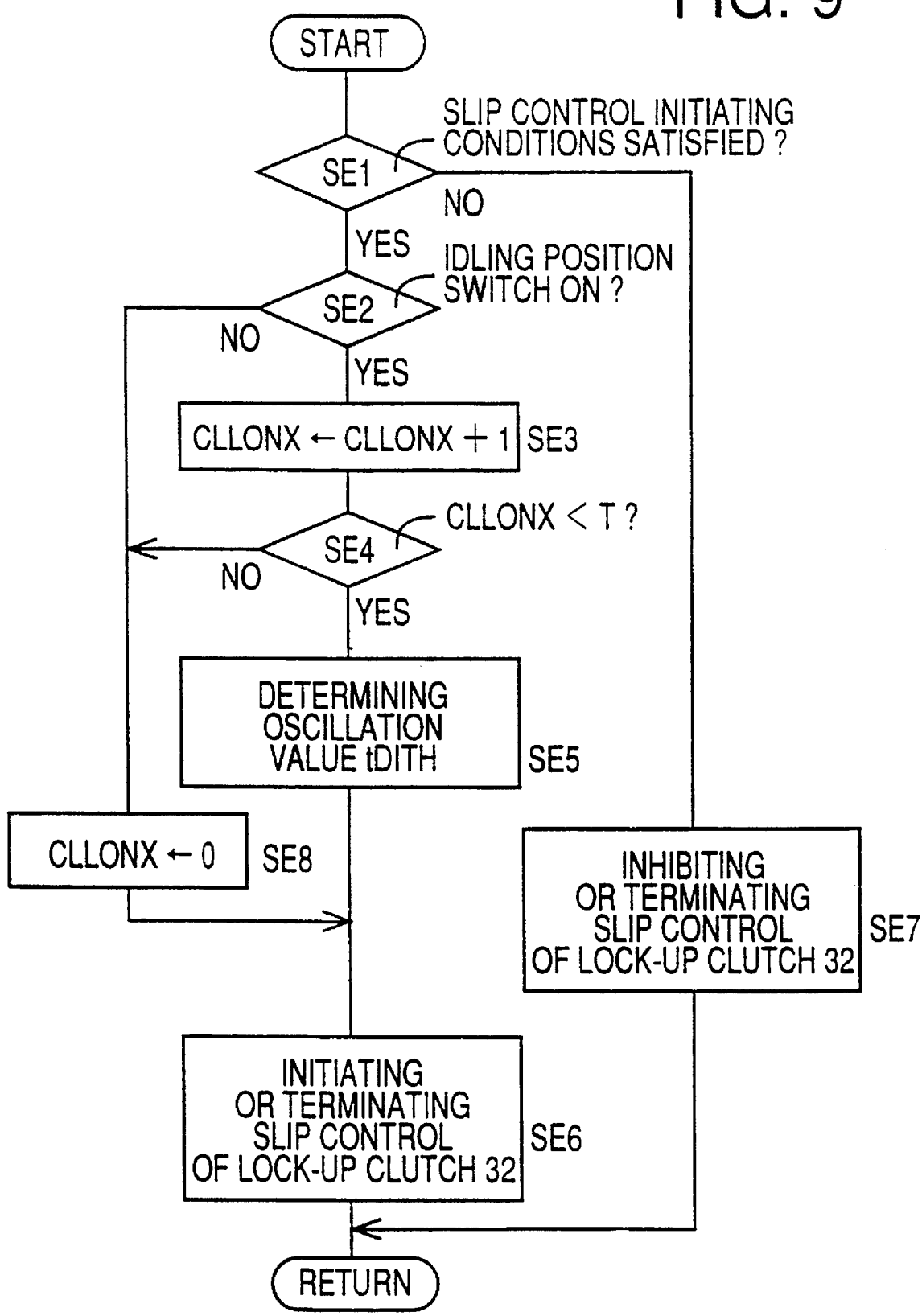
FIG. 9 is a flow chart schematically illustrating an operation of the-slip control apparatus.

In the present embodiment illustrated in FIG. 9, step SE5 is implemented so that the output changing means 198 oscillates the slip control output $D_{SLU}$ of the slip control means 196 at the predetermined period, so as to oscillate the pressure difference ΔP of the piston 30 without vibrating the piston 30. Consequently, the thrust force acting on the piston 30 is oscillated, and the piston 30 may be smoothly moved with improved response to a change in the slip control output $D_{SLU}$, whereby the amount of slip of the lock-up clutch 32 can be controlled with high stability, even if the pressure difference is relatively small, that is, even when the target slip speed $TN_{SLP}$ determined depending upon the vehicle running condition is almost equal to the slip speed of the torque converter 12 which would be established when the lock-up clutch 32 is placed in the fully released state.

It is also noted that the step SE5 corresponding to the output oscillating means 198 to oscillate the slip control output $D_{SLU}$ of the slip control means 196 is implemented only when the affirmative decision (YES) is obtained in step SE2 corresponding to the torque monitoring means 200, that is, only when the torque monitoring means 200 determines that the transmission torque of the lock-up clutch 32 is relatively small. That is, it is not required to oscillate the slip control output $D_{SLU}$ during the entire period of the slip control means 196, which includes the linear solenoid valve SLU to provide the SLIP CONTROL pilot pressure $P_{SLU}$ for controlling the pressure difference ΔP. Accordingly, the life expectancy of the valve SLU is increased.

In the present embodiment of FIG. 9, the oscillation time determining means 202 (steps SE3 and SE4) is provided to command the output oscillating means 198 to oscillate the slip control output $D_{SLU}$ of the slip control means 196, for only the predetermined time after the torque determining means 200 has determined in step SE2 that the idling position switch of the throttle sensor 167 is in the ON position, that is, for only the predetermined time (corresponding to the threshold value T) during which the transmission torque of the lock-up clutch 32 is relatively small. The limited period of the oscillation of the slip control output leads to further increased life expectancy of the linear solenoid valve SLU which is operated to control the pressure difference ΔP of the lock-up clutch 32. It is also noted that the learning control value KGD in the above equation (2) can be determined within the predetermined time after the idling position switch is turned ON, so that the slip control of the lock-up clutch (2) according to the equation 32may be effected with high stability even after the predetermined time has passed, that is, even after the oscillation of the slip control output by the output oscillating means 198 is terminated.

Figure 12:
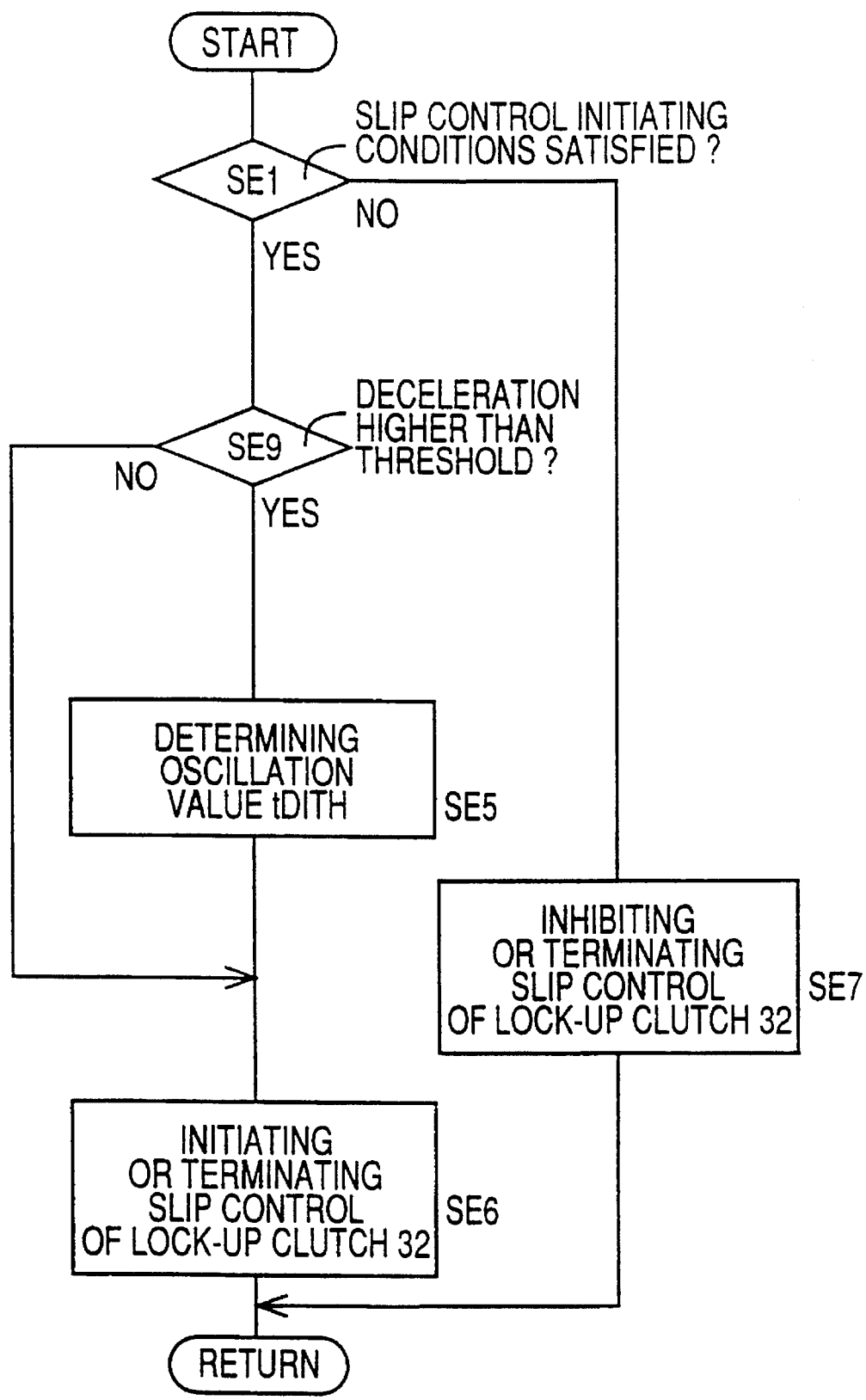
FIG. 12 is a flow chart illustrating an operation of a slip control apparatus according to another embodiment of this invention.

There will next be described another embodiment of this invention wherein a routine illustrated in FIG. 12 is executed by the transmission controller 184, in place of or in parallel with the routine of FIG. 9. In the routine of FIG. 12, step SE9 is substituted for steps SE2-SE4 of FIG. 9. Step SE9 corresponds to the deceleration monitoring means 204 indicated above. This step SE9 is provided to determine whether the deceleration rate of the vehicle is higher than a predetermined threshold. This determination may be effected on the basis of an output signal of a suitable sensor which represents the vehicle deceleration, for example: a sensor for detecting the accelerator or deceleration of the vehicle; a sensor for detecting the pressure of a brake fluid applied to a brake of the vehicle; and a sensor for detecting an amount of operation of the brake pedal. The threshold of the deceleration rate is determined so that the determination in step SE9 makes it possible to determine whether the vehicle is in a decelerating state that causes a control hunting of the slip speed of the lock-up clutch 32 due to a sudden drop of the engine speed $N_E$ (=turbine impeller speed $N_T$) when the vehicle running condition has entered the slip control area of FIG. 7. In a simple arrangement of the deceleration monitoring means 204, the brake switch 172 may be used as a sensor for detecting the vehicle deceleration in step SE9.

If a negative decision (NO) is obtained in step SE9, the control flow goes to step SE6 to effect the slip control of the lock-up clutch 32 without activation of the output oscillating means 198. If an affirmative decision (YES) is obtained in step SE9, the control flow goes to step SE5 to determine the oscillation value tDITH to oscillate the overall slip control output $D_{SLU}$ in step SE6. Steps SE5 and SE6 are repeatedly implemented until the negative decision (NO) is obtained in step SE9. However, the oscillation of the slip control output may be effected for a predetermined length of time after the affirmative decision is obtained in step SE9.

In the present second embodiment of the invention, the slip control output $D_{SLU}$ of the slip control means 196 is oscillated at the predetermined period TDITH by the output oscillating means 198 for a predetermined length of time after the deceleration monitoring means 204 has determined that the vehicle deceleration exceeds the predetermined threshold. This arrangement is effective to avoid control instability of the lock-up clutch 32 which would result from a low response of the piston 30 due to a small pressure difference $\Delta P$ when the target slip speed $TN_{SLP}$ is almost equal to the actual slip speed $N_{SLP}$, for example, when the vehicle running condition has entered the slip control area of FIG. 7 with the engine speed $N_E$ being suddenly lowered upon deceleration of the vehicle by brake application. The oscillation of the slip control output causes oscillation of the pressure difference $\Delta P$, and oscillation of the thrust force acting on the piston 30, which permits the piston 30 to be smoothly moved in response to a change in the slip control output, thereby assuring improved control stability of the lock-up clutch 32.

Figure 13:
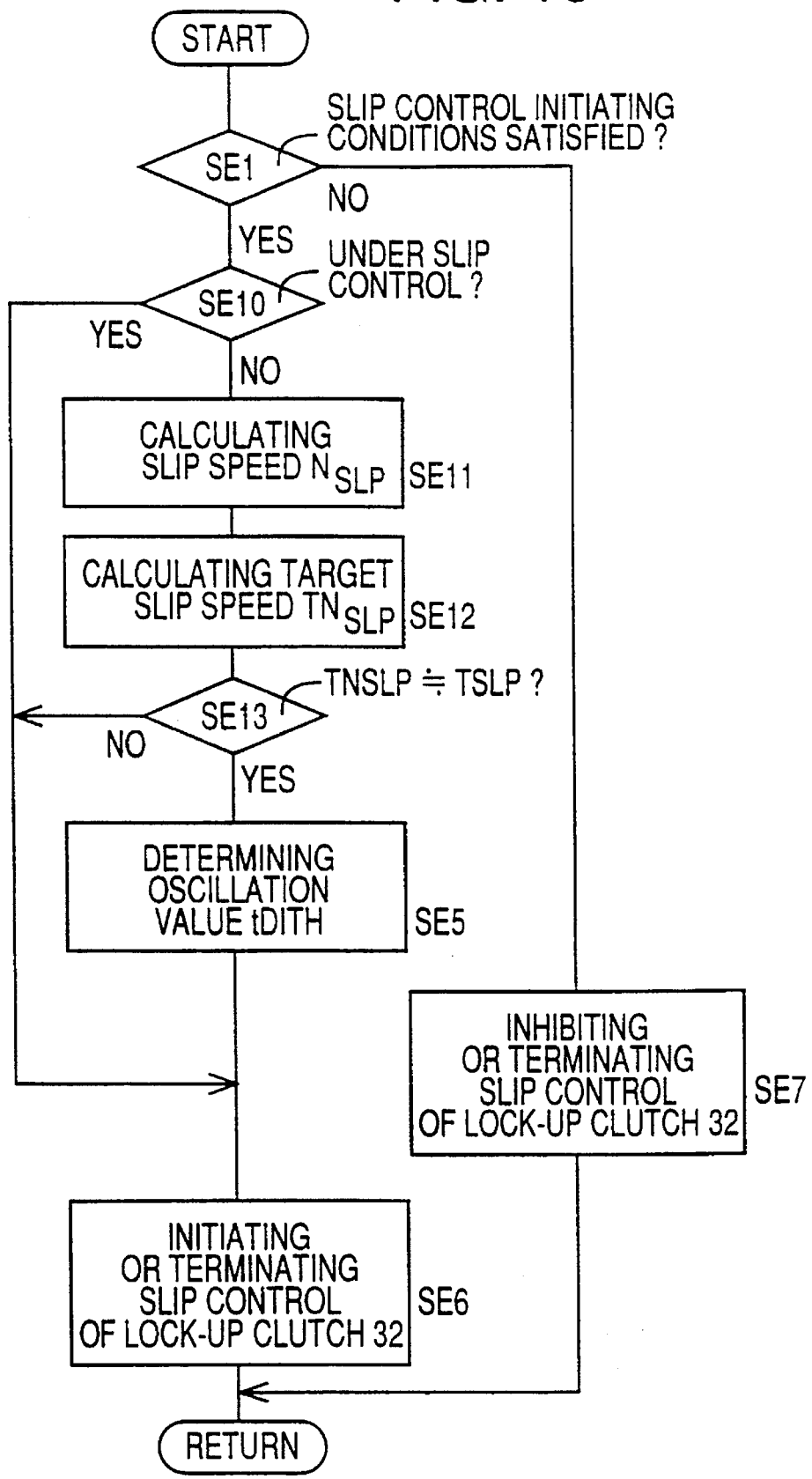
FIG. 13 is a flow chart illustrating an operation of a slip control apparatus according to a further embodiment of this invention.

A third embodiment of the invention will be described by reference to the flow chart of FIG. 13, which illustrates a routine to be executed in place of or in parallel with the routine of FIG. 9. In the routine of FIG. 13, steps SE10 through SE13 are substituted for steps SE2–SE4 of FIG. 9.

Step SE10 is provided to determine whether the slip control means 196 is in operation. If an affirmative decision (YES) is obtained in step SE10, the control flow goes to step SE6 to continue the slip control of the lock-up clutch 32. If a negative decision (NO) is obtained in step SE10, the control flow goes to step SE11 corresponding to the slip speed calculating means 106, to calculate the slip speed $N_{SLP}$ $(=N_P-N_T)$, which is a difference between the speeds $N_P$ and $N_T$ of the pump and turbine impellers 18, 22. Then, step SE12 corresponding to the target slip speed determining means 208 is implemented to determine the target slip speed $TN_{SLP}$ on the basis of the throttle valve opening TAP and the input speed Nin of the transmission 14 (turbine impeller speed $N_T$), and according to the predetermined relationship as indicated in the graph of FIG. 10.

Step SE12 is followed by step SE13 corresponding to the slip speed monitoring means 210, to determine whether the actual slip speed $N_{SLP}$ is almost equal to the target slip speed $TN_{SLP}$. Step SE13 is provided to determine whether the pressure difference $\Delta P$ of the piston 30 when the vehicle running condition is in the slip control area of FIG. 7 is considerably small. If an affirmative decision (YES) is obtained in step SE13, the control flow goes to step SE5 to determine the oscillation value tDITH, so that the slip control output $D_{SLU}$ is oscillated by the oscillation value tDITH in step SE6 which follows step SE5. Steps SE5 and SE6 are repeatedly implemented until the slip control of the lock-up clutch 32 is terminated in step SE7 or until the negative decision (NO) is obtained in step SE13.

In the present third embodiment, the output oscillating means 198 oscillates the slip control output $D_{SLU}$ $(=I_{SLU}$ or $P_{SLU})$ in step SE13 at the predetermined period, if the slip speed monitoring means 210 determines in step SE13 that the actual and target slip speeds $N_{SLP}$ and $TN_{SLP}$ are almost equal to each other. As a result, the pressure difference $\Delta P$ of the piston 30 is oscillated, and the thrust force acting on the piston 30 is accordingly oscillated, whereby the piston 30 is smoothly moved in response to a change in the slip control output $D_{SLU}$ even when the pressure difference $\Delta l$ is considerably small. This arrangement is based on a finding that the response of the piston 30 tends to be low where the pressure difference $\Delta P$ is small with the pump and turbine impeller speeds being substantially equal to each other at the time of initiation of the slip control of the lock-up clutch 32, even if the throttle opening TAP is not considerably small.

While the present invention has been described in detail in its presently preferred embodiments, it is to be understood that the invention is not limited to the details of the illustrated embodiments, but may be otherwise embodied.

In the first embodiment of FIG. 9, the determination by the torque monitoring means 200 as to whether the transmission torque of the lock-up clutch 32 is smaller than a predetermined threshold is effected by determining whether the idling position switch of the throttle sensor 167 is in the ON position or not. However, the torque monitoring means 200 may rely on other suitable parameters which reflect a change in the transmission torque of the lock-up clutch 32. For example, the torque monitoring means 200 may use the engine speed $N_E$, throttle opening TAP of the throttle valve 166, an amount of fuel injection into the engine 10, an operating amount of the accelerator pedal 165, or the transmission torque as detected by a suitable torque sensor.

The throttle opening TAP used to determine the target slip speed $TN_{SLP}$ may be replaced by other suitable parameters representative of a load acting on the engine 10, such as the operating amount of the accelerator pedal 165, or the amount of fuel injection or intake air quantity of the engine 10.

In the third embodiment of FIG. 13, the output of the turbine speed sensor 178 is directly used by the speed calculating means 206 to detect the speed $N_T$ (=speed Nin of the input shaft 20 of the automatic transmission 14) for calculating the actual slip speed $N_{SLP}$ $(=N_P-N_T)$ in step SE12. However, the turbine impeller speed $N_T$ may be calculated by using other speed sensors such as the vehicle speed sensor 168 adapted to detect the speed Nout of the output shaft 40 of the transmission 14, or a wheel speed sensor adapted to detect the rotating speed of a vehicle wheel. Where the vehicle speed sensor 168 is used, the turbine impeller speed $N_T$ may be calculated by multiplying the output shaft speed Nout of the transmission 14 by a currently selected speed ratio of the transmission 14. Where the wheel speed sensor is used, the turbine impeller speed $N_T$ may be calculated by multiplying the wheel speed by the speed ratio of the transmission 14 and the speed reduction ratio of the final gear device. In these cases where the turbine impeller speed $N_T$ is calculated from the speed Nout or wheel speed, the turbine speed sensor 178 is not necessary.

Although the hydraulic control device 44 is arranged as illustrated in FIG. 4, the construction of the device 44 may be modified as needed. For instance, the lock-up relay valve 52 and the lock-up clutch control valve 56 may be combined into a unitary structure.

While the automatic transmission 14 is connected to the torque converter 12 equipped with the lock-up clutch 32, the torque converter 12 may be replaced by other fluid-filled power transmitting device equipped with a lock-up clutch, such as a fluid coupling equipped with a lock-up clutch.

It is to be understood that the present invention may be embodied with various other changes, modifications and improvements, which may occur to those skilled in the art, without departing from the spirit and scope of the invention defined in the following claims.

What is claimed is:

1. An apparatus for controlling an amount of slip of a lock-up clutch disposed between a pump impeller and a turbine impeller of a fluid-filled power transmitting device of a motor vehicle, said lock-up clutch including a piston operated by a pressure difference between hydraulic pressures in two oil chambers formed on opposite sides of the piston, said apparatus comprising:

slip control means for effecting a slip control operation according to a slip control output to control the amount of slip of said lock-up clutch while a running condition of the vehicle is in a predetermined slip control area, such that an actual slip speed of the lock-up clutch coincides with a target slip speed determined depending upon said running condition, said slip control output consisting of a duty ratio determined on the basis of a difference between said actual slip speed and said target slip speed; and output oscillating means operable during said slip control operation of said slip control means, for oscillating said duty ratio of said slip control means at a predetermined frequency, to oscillate said pressure difference.

2. An apparatus according to claim 1, further comprising torque monitoring means operable during said slip control operation of said slip control means, for determining whether a torque transmitted through said lock-up clutch is smaller than a predetermined threshold, and wherein said output oscillating means oscillates said slip control output if said torque monitoring means determines that said torque is smaller than said predetermined threshold.

3. An apparatus according to claim 2, wherein said torque monitoring means determines that said torque is smaller than said predetermined threshold, if said slip control operation of said slip control means is effected during deceleration of the vehicle.

4. An apparatus according to claim 2, said torque monitoring means comprises obtaining means for obtaining a speed of an engine of the vehicle, said torque monitoring means determines that said torque is smaller than said predetermined threshold, if said obtaining means determines that the obtained speed of said engine is lower than a predetermined value.

5. An apparatus for controlling an amount of slip of a lock-up clutch disposed between a pump impeller and a turbine impeller of a fluid-filled power transmitting device of a motor vehicle, said lock-up clutch including a piston operated by a pressure difference between hydraulic pressures in two oil chambers formed on opposite sides of the piston, said apparatus comprising:

slip control means for effecting a slip control operation according to a slip control output to control the amount of slip of said lock-up clutch while a running condition of the vehicle is in a predetermined slip control area, such that an actual slip speed of the lock-up clutch coincides with a target slip speed determined depending upon said running condition;

output oscillating means operable during said slip control operation of said slip control means, for oscillating said slip control output of said slip control means, to oscillate said pressure difference without vibrating said piston; and deceleration monitoring means for determining whether a rate of deceleration of the vehicle is higher than a predetermined threshold, said output oscillating means oscillating said slip control output if said deceleration monitoring means determines that said rate of deceleration is higher than said predetermined threshold.

6. An apparatus according to claim 5, wherein said deceleration monitoring means comprises determining means for determining whether a brake of the vehicle is in operation, said deceleration monitoring means determines that said rate of deceleration of the vehicle is higher than said predetermined threshold, if said determining means determines that said brake is in operation.

7. An apparatus according to claim 1, further comprising:

slip speed calculating means operable upon initiation of said slip control operation of said slip control means, for calculating an slip speed of said lock-up clutch which is a difference between rotating speeds of said pump and turbine impellers of said fluid-filled power transmitting device;

target slip speed determining means operable upon initiation of said slip control operation, for determining a target slip speed of said lock-up clutch; and slip speed monitoring means for determining whether said actual slip speed calculated by said slip speed calculating means is almost equal to said target slip speed determined by said target slip speed determining means, and wherein said output oscillating means oscillates said slip control output of said slip control means if said slip speed monitoring means determines that said actual slip speed is almost equal to said target slip speed.

8. An apparatus according to claim 1, wherein said slip control area is defined at least by a parameter indicative of a load acting on an engine of the vehicle.

9. An apparatus according to claim 1, wherein said predetermined frequency is 5–20 Hz.

10. An apparatus according to claim 9, wherein said predetermined frequency is 7–15 Hz.

11. An apparatus according to claim 10, wherein said predetermined frequency is about 10 Hz.

12. An apparatus for controlling an amount of slip of a lock-up clutch disposed between a pump impeller and a turbine impeller of a fluid-filled power transmitting device of a motor vehicle, said lock-up clutch including a piston operated by a pressure difference between hydraulic pressures in two oil chambers formed on opposite sides of the piston, said apparatus comprising:

slip control means for effecting a slip control operation according to a slip control output to control the amount of slip of said lock-up clutch while a running condition of the vehicle is in a predetermined slip control area, such that an actual slip speed of the lock-up clutch coincides with a target slip speed determined depending upon said running condition; and output oscillating means operable during said slip control operation of said slip control means, for oscillating said slip control output of said slip control means, to oscillate said pressure difference for smooth movement of said piston irrespective of a sliding resistance of the piston.

13. An apparatus according to claim 12, wherein said predetermined frequency is 5–20 Hz.

14. An apparatus according to claim 13, wherein said predetermined frequency is 7–15 Hz.

15. An apparatus according to claim 14, wherein said predetermined frequency is about 10 Hz.

16. An apparatus for controlling an amount of slip of a lock-up clutch disposed between a pump impeller and a turbine impeller of a fluid-filled power transmitting device of a motor vehicle, said lock-up clutch including a piston operated by a pressure difference between hydraulic pressures in two oil chambers formed on opposite sides of the piston, said apparatus comprising:

slip control means for effecting a slip control operation according to a slip control output to control the amount of slip of said lock-up clutch while a running condition of the vehicle is in a predetermined slip control area, such that an actual slip speed of the lock-up clutch coincides with a target slip speed determined depending upon said running condition;

output oscillating means operable during said slip control operation of said slip control means, for oscillating said slip control output of said slip control means, to oscillate said pressure difference without vibrating said piston; and torque monitoring means operable during maid slip control operation of said slip control means, for determining whether a torque transmitted through said lock-up clutch is smaller than a predetermined threshold, said torque monitoring means comprising an idling position switch for detecting an engine idling position of a throttle valve for idling an engine of the vehicle, said torque monitoring means determining that said torque is smaller than said predetermined threshold, if said idling position switch has detected said engine idling position of said throttle valve, said output oscillating means oscillating said slip control output for a predetermined length of time after said idling position switch has detected said engine idling position of said throttle valve.

17. An apparatus for controlling an amount of slip of a lock-up clutch disposed between a pump impeller and a turbine impeller of a fluid-filled power transmitting device of a motor vehicle, said lock-up clutch including a piston operated by a pressure difference between hydraulic pressures in two oil chambers formed on opposite sides of the piston, said apparatus comprising;

slip control means for effecting a slip control operation according to a slip control output to control the amount of slip of said lock-up clutch while a running condition of the vehicle is in a predetermined slip control area, such that an actual slip speed of the lock-up clutch coincides with a target slip speed determined depending upon said running condition;

output oscillating means operable during said slip control operation of said slip control means, for oscillating said slip control output of said slip control means, to oscillate said pressure difference without vibrating said piston; and determining means for determining whether said running condition of the vehicle enters said predetermined slip control area as a result of a sudden drop of a speed of an engine of the vehicle, said output oscillating means oscillating said slip control output if said determining means determines that said running condition of the vehicle enters said predetermined slip control area as a result of said sudden drop of the speed of the engine.

18. An apparatus for controlling an amount of slip of a lock-up clutch disposed between a pump impeller and a turbine impeller of a fluid-filled power transmitting device of a motor vehicle, said lock-up clutch including a piston operated by a pressure difference between hydraulic pressures in two oil chambers formed on opposite sides of the piston, said apparatus comprising:

slip control means for effecting a slip control operation according to a slip control output to control the amount of slip of said lock-up clutch while a running condition of the vehicle is in a predetermined slip control area, such that an actual slip speed of the lock-up clutch coincides with a target slip speed determined depending upon said running condition; and output oscillating means operable during said slip control operation of said slip control means, for oscillating said slip control output of said slip control means, to oscillate said pressure difference without vibrating said piston, said slip control means providing said slip control output on the basis of a feed-forward control value which varies as a function of a load acting on an engine of the vehicle, a feedback control value which varies as a function of an error between said actual slip speed and said target slip speed of said lock-up clutch, and an oscillation value determined by said output oscillating means.

* * * * *

UNITED STATES PATENT AND TRADEMARK OFFICE
CERTIFICATE OF CORRECTION

PATENT NO.   : 5,611,750
DATED        : March 18, 1997
INVENTOR(S)  : Katsumi KONO, et al.

It is certified that error appears in the above-indentified patent and that said Letters Patent is hereby corrected as shown below:

On the title page, Item [73], the assignee, should read:

--Toyota Jidosha Kabushiki Kaisha, Toyota, Japan--

Signed and Sealed this

Twenty-eighth Day of October, 1997

Attest:

BRUCE LEHMAN

Attesting Officer

Commissioner of Patents and Trademarks